United States Patent [19]

Zaidi et al.

[11] Patent Number: 6,049,897
[45] Date of Patent: Apr. 11, 2000

[54] MULTIPLE SEGMENT REGISTER USE WITH DIFFERENT OPERAND SIZE

[75] Inventors: Nazar A. Zaidi, San Jose; Kenneth D. Shoemaker, Los Altos Hills; Gary N. Hammond, Campbell, all of Calif.

[73] Assignee: Intel Corporation, Santa Clara, Calif.

[21] Appl. No.: 08/779,791

[22] Filed: Jan. 7, 1997

[51] Int. Cl.$^7$ .................................................. G06F 11/16
[52] U.S. Cl. ............................................ 714/53; 711/220
[58] Field of Search ........................ 395/183.05, 183.06, 395/183.07, 183.18, 183.19, 183.2, 185.06, 570, 500; 711/152, 163, 201, 208, 209, 210, 220

[56] References Cited

U.S. PATENT DOCUMENTS

| | | | |
|---|---|---|---|
| 4,442,484 | 4/1984 | Childs, Jr. et al. | 364/200 |
| 4,972,338 | 11/1990 | Crawford et al. | 364/200 |
| 5,440,710 | 8/1995 | Richter et al. | 395/417 |
| 5,517,651 | 5/1996 | Huck et al. | 395/570 |
| 5,517,657 | 5/1996 | Rodgers et al. | 395/800 |
| 5,644,755 | 7/1997 | Wooten | 395/500 |
| 5,717,903 | 2/1998 | Bonola | 395/500 |

OTHER PUBLICATIONS

"Intel 486 Microprocessor Family Programmer's Reference Manual", Intel Corporation, U.S. pp. 2–1—2–24, 5–1— 5–25, 6–1—6–25 (1992).

"Pentium Processor Family Developer's Manual", Intel Corporation, U.S., pp. 3–1—3–24, 11–1—11–25, 12–1—12–27 (vol. 3, 1995).

*Primary Examiner*—Robert W. Beausoliel, Jr.
*Assistant Examiner*—Pierre E. Elisca
*Attorney, Agent, or Firm*—Blakely, Sokoloff, Taylor & Zafman

[57] ABSTRACT

A new method and apparatus are used to check for segment limit violations during memory access. When a segment descriptor is retrieved during the initialization of a segment, the segment limit from the segment descriptor is used to create five limits. The five limits are the last possible address within the segment for each size of memory access. During a subsequent memory access, the limit corresponding to the segment being accessed and the length of memory access is selected. The selected limit is compared against the address of the memory access to determine if a limit violation has occurred. If a limit violation has occurred, a flag is set that, when read, will cause an exception.

7 Claims, 3 Drawing Sheets

MULTIPLE SEGMENT REGISTER USE WITH DIFFERENT OPERAND SIZE

BACKGROUND OF THE INVENTION

1. Field of the Invention

The present invention relates generally to the field of microprocessors, and, more particularly, it concerns a method and apparatus for performing segment limit checks during a memory access.

2. Description of Related Art

Modem computer systems use different techniques for managing the memory of the computer system. Memory is typically used for storing information or for storing program instructions for the computer system. Memory management allows the operating system of the computer system to create simplified environments for running programs.

A common technique used in modem computer systems for memory management is segmentation. Segmentation divides the memory of the computer system into sections called segments. Each segment is an independent, protected region of memory that has common attributes. For example, all of the code for an application program may be contained in a single segment, or an operating system table may reside in a single segment. Further, each application program can be allocated several segments for its use.

Segment registers are used to identify the memory region addressable for a particular segment. Each segment register indexes an associated segment descriptor, when the microprocessor is in protected mode. Each segment descriptor includes a base address, a segment limit, and protection attributes for a particular segment. The base address is the beginning address of the segment, and the segment limit defines the valid range of memory addresses available. When a segment register is initialized an associated segment descriptor is retrieved. Segment descriptors are generally stored in a segment descriptor table located in main memory.

Segmentation can be used to control memory access by implementing segment based memory addressing. When memory is accessed, an address is formed by adding an offset to the base address of the segment. This provides the beginning address for the memory access. For more information on segmentation see Pentium® Processor Family Developers Manual, Intel Corporation, 1995, Chapter 3.

Memory access cannot be outside the defined valid region of the segment being accessed. For example, assume for an expand-up segment that the base is $000F0000_{16}$ and the segment limit is $00001000_{16}$. All memory references for this segment must be between $000F0000_{16}$ and $000F1000_{16}$. Any memory references for this segment outside of this range are outside of the segment. Limit checks are used with every memory access to prevent references to memory beyond the segment limit of the specified segment. When a memory access is beyond the segment limit, a limit check triggers an exception. An exception causes the operating system to disallow the memory access. Limit checks are needed to ensure that memory in another segment is not overwritten.

In prior computer systems, determination of a segment limit violation for an expand-up segment required several steps. The segment limit check guarantees that the entire memory access is within the segment limit. To ensure this protection, some prior art techniques first required that the beginning address of memory access be compared with the segment limit. If the beginning address was greater than the limit, then a limit violation occurred. The prior art technique also required the calculation of the end address of the memory access. The end address of the memory access was calculated by adding the length of memory access to the beginning address. Next, the end address was compared to the segment limit. If the end address was greater than the segment limit, then a limit violation occurred. Thus, a separate addition step was necessary before a compare operation could take place. For more information on limit checking see Pentium® Processor Family Developers Manual, Intel Corporation, 1995, Chapter 12.

The multiple steps required by the prior art limit checking technique take time. As microprocessors develop, clock frequencies continue to increase, making it difficult to perform these steps in a single clock cycle. Rather, the prior art method of limit checking may require two clock cycles or more depending on the clock frequency. Memory accesses occur very frequently. Thus, the prior art method of limit checking will be detrimental to the performance of higher frequency microprocessors.

The present invention is directed to overcoming, or at least reducing the effects of the problem set forth above.

SUMMARY OF THE INVENTION

In one aspect of the invention a method for generating a plurality of limits for a segment of memory in a microprocessor capable of executing a plurality of types of memory accesses is described. Each type of memory access includes accessing information of a different length in a segment of memory. The segment of memory has an address representative of the last address location within the segment of memory. First, the last address location within the segment of memory is retrieved. A limit for each type of memory access based on the last address location and the length of each type of memory access is generated.

In another aspect of the invention a method of checking for segment limit violations during memory access in a microprocessor capable of executing a plurality of types of memory accesses is described. Each type of memory access includes accessing information of a different length in a segment of memory. The segment of memory has an address representative of the last address location within the segment of memory. First, the last address location within the segment of memory is retrieved. A limit for each type of memory access based on the last address location and the length of each type of memory access is generated. During memory access, one of the limits is selected based on the type of memory access and a segment number corresponding to the segment of memory being accessed. The starting address of memory access is compared to the selected limit. Then, a limit violation flag is set if the starting address of memory access is greater than the selected limit.

BRIEF DESCRIPTION OF THE DRAWINGS

The foregoing and other advantages of the invention will become apparent upon reading the following detailed description and upon reference to the following drawings. The present invention is not limited to the described embodiments.

DETAILED DESCRIPTION

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail so as not to unnecessarily obscure the present invention. While the detailed description describes the invention in the context of Intel® architecture microprocessors, it is contemplated that the invention will apply to other microprocessor architectures.

Figure 1:
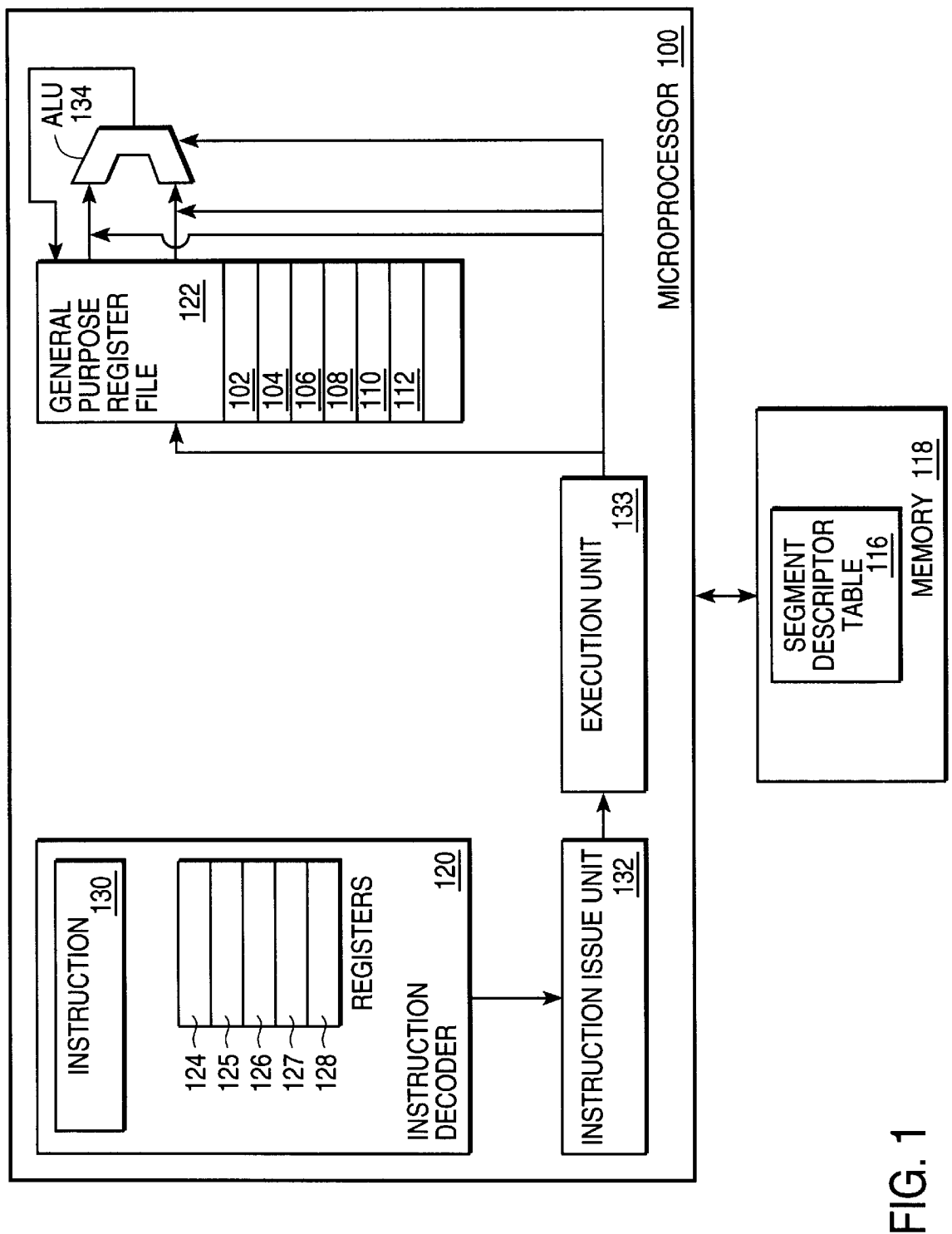
FIG. 1 illustrates a block diagram of one illustrative embodiment of the invention.

Turning now to the drawings, and in particular to FIG. 1, a microprocessor 100 configured to perform a memory access is shown. The microprocessor 100 has six segment registers 102, 104, 106, 108, 110, and 112 located in a General Purpose Register File 122 of the microprocessor 100. It will be understood by one skilled in the art that the segment registers 102, 104, 106, 108, 110, and 112 do not have to be located in the General Purpose Register File 122, but rather, can be placed in a special register file. There are four data segment registers 106, 108, 110, and 112, one stack segment register 104, and one code segment register 102.

The segment registers 102, 104, 106, 108, 110, and 112 are used to identify the memory region addressable for a particular segment. When the microprocessor 100 is in protected mode, each segment register 102, 104, 106, 108, 110, and 112 is used to index an associated segment descriptor. When one of the segment registers 102, 104, 106, 108, 110, and 112 is initialized, an associated segment descriptor is retrieved. A segment descriptor includes the segment base, an address representative of the last address location in the segment, and miscellaneous protection attributes, and is stored in a segment descriptor table 116 located in system memory 118. In Intel architecture, the address representative of the last address location in the segment is referred to as the segment limit.

When a segment descriptor is retrieved from the segment descriptor table 116, five segment limits are generated from the segment limit contained in the segment descriptor. The generation of the five limits is performed by limit checking microcode established by an Instruction Decoder 120. The five different limits generated correspond to every possible memory access length. The possible memory access lengths are one byte, two bytes, four bytes, eight bytes, and ten bytes. Thus, there is a separate limit for a one-byte access, a separate limit for a two-byte access, a separate limit for a four-byte access, a separate limit for an eight-byte access, and a separate limit for a ten-byte access. For example, assume there is a segment limit of $00001000_{16}$ for a particular segment. The limits created for this segment limit would be as follows:

$00001000_{16}$-one-byte access;
$00000FFF_{16}$-two-byte access;
$00000FFD_{16}$-four-byte access;
$00000FF9_{16}$-eight-byte access; and
$00000FF7_{16}$-ten-byte access.

These limits are calculated according to the following formula: Segment limit minus length of memory access plus one. The limits represent the last possible address which may be used for each particular length of access. Thus, a four byte memory access in the above example may not begin with an address greater than $00000FFD_{16}$.

After the establishment of the limit generation microcode by the Instruction Decoder 120, the limit generation microcode proceeds to an Instruction Issue Unit 132. The Instruction Issue Unit 132 stages the limit generation microcode for execution. The limit generation microcode is executed by an Execution Unit 133. Execution is performed in a manner well known by those skilled in the art. For example, the execution can be performed in the same manner as in the Intel® Pentium® processor. During execution, the five limits generated by the limit generation microcode are loaded into registers in the General Purpose Register File 122. The names of the registers used for storing the limits are then loaded into registers in the Instruction Decoder 120. The Instruction Decoder 120 contains five registers 124–128, one for each data and stack segment, in which the register names for the limits of each segment are stored. Thus, when a memory reference instruction 130 is decoded by the Instruction Decoder 120, limits for all accessible data and stack segments have already been stored in the General Purpose Register File 122 and can be accessed by the Instruction Decoder 120 using the register names stored in the registers 124–128.

When a memory reference instruction 130 is decoded, the Instruction Decoder 120 recognizes the instruction as a memory reference instruction. Limit checking microcode in the Instruction Decoder 120 is then established containing the name of the register used for storing one of the five different limits for the segment being accessed. The register name for the correct limit is selected by the Instruction Decoder 120 from the registers 124–128 based on the length of memory access and the segment number obtained from the decoded memory reference instruction 130. After the establishment of the limit checking microcode, the Instruction Decoder 120 establishes microcode which generates the starting address for the memory reference and loads this address in a register in the General Purpose Register File 122.

The limit checking microcode proceeds to an Instruction Issue Unit 132. The Instruction Issue Unit 132 stages the limit checking microcode for execution. The limit checking microcode is executed by the Execution Unit 133. The microcode used to generate the starting address of the memory reference is also executed by the Execution Unit 133 after being staged by the Instruction Issue Unit 132. During execution, the starting address of the memory reference is placed in a register in the General Purpose Register File 122. The limit checking microcode instructs an Arithmetic Logic Unit (ALU) 134 to select the appropriate registers containing the limit and the starting address of the memory reference and compare them. If the starting address of the memory reference is less than or equal to the limit, then the memory access continues. If the starting address is greater than the limit, the ALU 134 sets a flag which is written to a register in the General Purpose Register File 122. When the instruction 130 is ready to retire, this flag is checked. If the flag is set, an exception is generated.

Figure 2:
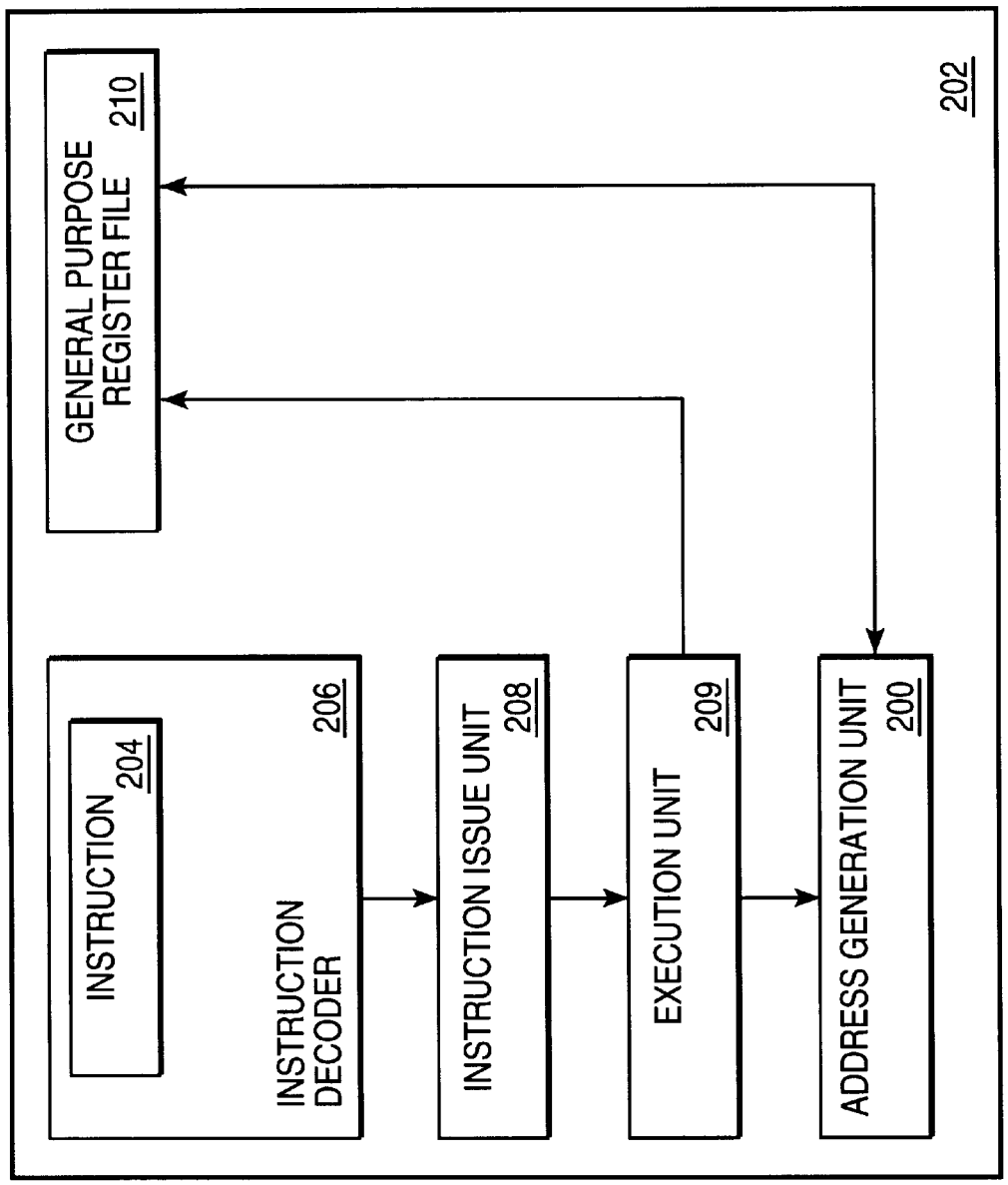
FIG. 2 illustrates a high level block diagram of a second illustrative embodiment of the invention.
Figure 3:
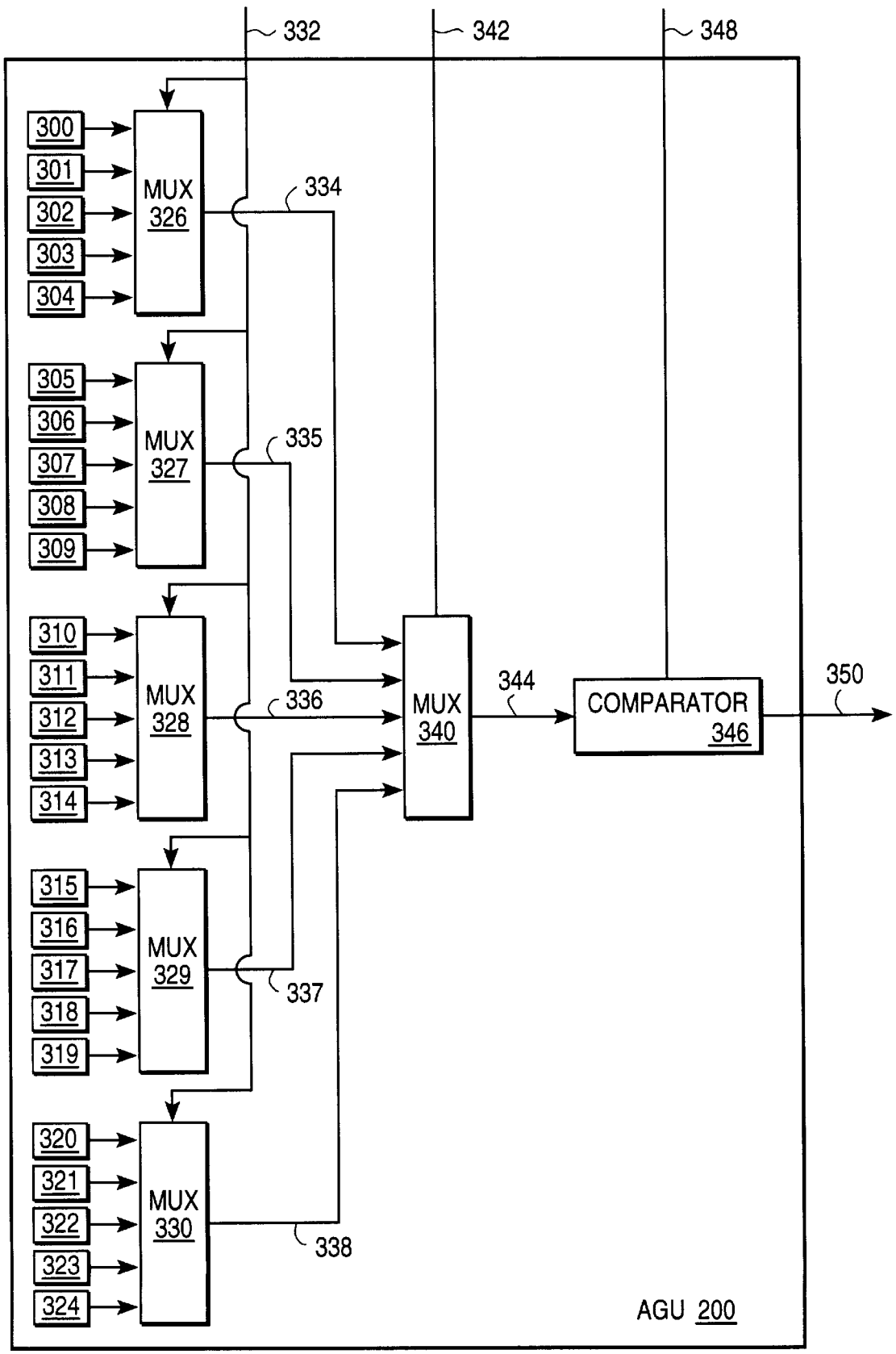
FIG. 3 illustrates a more detailed diagram of the Address Generation Unit.

Referring now to FIG. 2, an alternative embodiment of the present invention is illustrated. The limits for each segment are created as described above. However, the limits are stored in an Address Generation Unit (AGU) 200 of a microprocessor 202. Each limit is stored in a special limit register 300–324 in the AGU 200, as shown in FIG. 3. FIG. 3 is a more detailed illustration of AGU 200. In this embodiment, the selection of the appropriate limit and comparison is performed by hardware in the AGU 200 of the microprocessor 202.

Referring again to FIG. 2, when a memory reference instruction 204 is received by an Instruction Decoder 206, the Instruction Decoder 206 recognizes the instruction as a memory reference instruction. Microcode is then established by the Instruction Decoder 206. The established microcode provides the starting address of the current memory reference, the length of memory access, and the segment number. The microcode is then sent to the Instruction Issue Unit 208. The Instruction Issue Unit 208 stages the microcode for execution. The microcode is executed by an Execution Unit 209.

Upon execution of the microcode, the starting address for the memory reference is created and loaded into a register in the General Purpose Register File 210. From the General Purpose Register File 210, the starting address for the memory reference is passed to the AGU 200. The length of memory access and the segment number are also passed to the AGU 200.

Referring again to FIG. 3, the limit registers 300–324 are grouped into sets of five limit registers for each segment. Each set of five limit registers contains the possible limits for a particular segment. Further, each set of five limit registers 300–324 is input into a separate one of five multiplexers 326–330. A control line 332 for each of the five multiplexers 326–330 connected to the limit registers 300–324 delivers a signal that represents the length of the memory access. The outputs 334–338 of the five multiplexers 326–330 are the limits associated with the length of memory access for each segment. For example, a one-byte memory access selects limit registers 300, 305, 310, 315, and 320, and a four-byte memory access selects limit registers 302, 307, 312, 317, and 322.

The outputs 334–338 of the five multiplexers 326–330 are input into a sixth multiplexer 340. A control line 342 for the sixth multiplexer 340 delivers a signal that represents the segment number. The output 344 of the sixth multiplexer 340 is the limit for the memory reference.

The output 344 of the sixth multiplexer 340 is input into a comparator 346. A second input 348 into the comparator 346 is the starting address of memory reference. The comparator 346 compares the inputs 344 and 348. If the starting address of the memory reference is less than or equal to the limit, then the memory access continues. If the starting address is greater than the limit, an output 350 of the comparator 346 sets a flag which is written to a register in the General Purpose Register File 210. When the instruction 204 is ready to retire, this flag is checked. If the flag is set, an exception is generated.

What is claimed is:

1. An apparatus used for checking for segment limit violations during memory access in a microprocessor capable of executing a plurality of types of memory accesses wherein each type of memory access includes accessing information of a different length in a segment of memory, said segment of memory having an address representative of the last address location within said segment of memory, said apparatus comprising:

(a) an instruction decoder which establishes limit generation microcode to generate a plurality of limits from said representative address and said length of each type of memory access;

(b) an instruction issue unit coupled to said instruction decoder for receiving said limit generation microcode and staging said limit generation microcode for execution;

(c) an execution unit coupled to said instruction issue unit for executing said limit generation microcode and generating said plurality of limits; and (c) a plurality of registers coupled to said execution unit, said plurality of registers receiving said plurality of limits.

2. An apparatus used for checking for segment limit violations during memory access in a microprocessor capable of executing a plurality of types of memory accesses wherein each type of memory access includes accessing information of a different length in a segment of memory, said segment of memory having an address representative of the last address location within said segment of memory, said apparatus comprising:

(a) an instruction decoder which establishes limit generation microcode to generate a plurality of limits from said representative address and said length of each type of memory access;

(b) an instruction issue unit coupled to said instruction decoder for receiving said limit generation microcode and staging said limit generation microcode for execution;

(c) an execution unit coupled to said instruction issue unit for executing said limit generation microcode and generating said plurality of limits;

(d) a plurality of registers coupled to said execution unit, said plurality of registers receiving said plurality of limits;

(e) said instruction decoder being capable of decoding an instruction to produce a starting address of memory access, a segment number, and a length of memory access;

(f) said instruction decoder being capable of selecting a selected limit from said plurality of limits based on said length of memory access and said segment number;

(g) said instruction decoder being capable of establishing limit checking microcode, said limit checking microcode including operations to compare said selected limit with said starting address of memory access;

(h) said instruction issue unit for receiving said limit checking microcode and staging said limit checking microcode for execution;

(i) said execution unit for executing said limit checking microcode;

(j) an arithmetic logic unit coupled to said instruction issue unit, said arithmetic logic unit directed by said limit checking microcode during execution of said limit checking microcode to perform comparison on said selected limit and said starting address of memory access; and (k) said arithmetic logic unit being capable of writing a flag to said register file if said starting address for memory reference is greater than said selected limit.

3. An apparatus used for checking for segment limit violations during memory access in a microprocessor capable of executing a plurality of types of memory accesses wherein each type of memory access includes accessing information of a different length in a segment of memory, said segment of memory having an address representative of the last address location within said segment of memory, said apparatus comprising:

(a) an instruction decoder which establishes limit generation microcode to generate a plurality of limits from said representative address and said length of each type of memory access;

(b) an instruction issue unit coupled to said instruction decoder for receiving said limit generation microcode and staging said limit generation microcode for execution;

(c) an execution unit coupled to said instruction issue unit for executing said limit generation microcode and generating said plurality of limits;

(d) a plurality of registers coupled to said execution unit, said plurality of registers receiving said plurality of limits, said plurality of registers grouped in segment sets wherein each said segment set contains said plurality of limits for one segment;

(e) said instruction decoder being capable of decoding an instruction to produce a starting address of memory access, a segment number, and a length of memory access;

(f) a first plurality of selectors being coupled to said plurality of registers, each said segment set being input to one of said first plurality of selectors, said first plurality of selectors also receiving as input said length of memory access, each said first plurality of selectors producing an output based on said length of memory access;

(g) a second selector coupled to said outputs of said first plurality of selectors, said second selector receiving as input said output from said first plurality of selectors, said second selector also receiving as input said segment number, said second selector producing an output based on said segment number; and (h) a comparater coupled to said second selector, said comparater receiving as input said output from said second selector and said starting address of memory access, said comparater capable of comparing said output from second selector and said starting address of memory reference and producing a flag if starting address of memory reference is greater than said output from second selector.

4. The apparatus as set forth in claim 3, wherein said plurality of registers said first selector, said second selector, and said comparator are contained in an Address Generation Unit.

5. A system including a microprocessor used for checking for segment limit violations during memory access and a memory, said microprocessor capable of executing a plurality of types of memory accesses wherein each type of memory access includes accessing information of a different length in a segment of memory, said segment of memory having an address representative of the last address location within said segment of memory, said last address location within said segment of memory stored within said memory, said system comprising:

(a) an instruction decoder which establishes limit generation microcode to generate a plurality of limits from said representative address and said length of each type of memory access;

(b) an instruction issue unit coupled to said instruction decoder for receiving said limit generation microcode and staging said limit generation microcode for execution;

(c) an execution unit coupled to said instruction issue unit for executing said limit generation microcode and generating said plurality of limits;

(d) a plurality of registers coupled to said execution unit, said plurality of registers receiving said plurality of limits;

(e) said instruction decoder being capable of decoding an instruction to produce a starting address of memory access, a segment number, and a length of memory access;

(f) said instruction decoder being capable of selecting a selected limit from said plurality of limits based on said length of memory access and said segment number;

(g) said instruction decoder being capable of establishing limit checking microcode, said limit checking microcode including operations to compare said selected limit with said starting address of memory access;

(h) said instruction issue unit for receiving said limit checking microcode and staging said limit checking microcode for execution;

(i) said execution unit for executing said limit checking microcode;

(j) an arithmetic logic unit coupled to said instruction issue unit, said arithmetic logic unit directed by said limit checking microcode during execution of said limit checking microcode to perform comparison on said selected limit and said starting address of memory access; and (k) said arithmetic logic unit being capable of writing a flag to said register file if said starting address for memory reference is greater than said selected limit.

6. A system including a microprocessor used for checking for segment limit violations during memory access and a memory, said microprocessor capable of executing a plurality of types of memory accesses wherein each type of memory access includes accessing information of a different length in a segment of memory, said segment of memory having an address representative of the last address location within said segment of memory, said last address location within said segment of memory stored within said memory, said system comprising:

(a) an instruction decoder which establishes limit generation microcode to generate a plurality of limits from said representative address and said length of each type of memory access;

(b) an instruction issue unit coupled to said instruction decoder for receiving said limit generation microcode and staging said limit generation microcode for execution;

(c) an execution unit coupled to said instruction issue unit for executing said limit generation microcode and generating said plurality of limits;

(d) a plurality of registers coupled to said execution unit, said plurality of registers receiving said plurality of limits, said plurality of registers grouped in segment sets wherein each said segment set contains said plurality of limits for one segment;

(e) said instruction decoder being capable of decoding an instruction to produce a starting address of memory access, a segment number, and a length of memory access;

(f) a first plurality of selectors being coupled to said plurality of registers, each said segment set being input to one of said first plurality of selectors, said first plurality of selectors also receiving as input said length of memory access, each said first plurality of selectors producing an output based on said length of memory access;

(g) a second selector coupled to said outputs of said first plurality of selectors, said second selector receiving as input said output from said first plurality of selectors, said second selector also receiving as input said segment number, said second selector producing an output based on said segment number; and (h) a comparater coupled to said second selector, said comparater receiving as input said output from said second selector and said starting address of memory access, said comparater capable of comparing said output from second selector and said starting address of memory reference and producing a flag if starting address of memory reference is greater than said output from second selector.

7. The apparatus as set forth in claim 6, wherein said plurality of registers said first selector, said second selector, and said comparator are contained in an Address Generation Unit.

* * * * *